United States Patent [19]
Angelillo

[11] Patent Number: 4,741,579
[45] Date of Patent: May 3, 1988

[54] PNEUMATIC DISTRIBUTOR OF THE DUPLEX TYPE FOR MOTOR VEHICLE BRAKING SYSTEMS

[75] Inventor: Domenico Angelillo, Sesto San Giovanni, Italy

[73] Assignee: Industrie Magneti Marelli S.p.A., Milan, Italy

[21] Appl. No.: 33,377

[22] Filed: Apr. 2, 1987

[30] Foreign Application Priority Data

Apr. 2, 1986 [IT] Italy ................. 67265 A/86

[51] Int. Cl.⁴ .............................................. B60T 15/20
[52] U.S. Cl. .......................................... 303/52; 303/54
[58] Field of Search ................. 303/7, 40, 50, 52, 54

[56] References Cited

U.S. PATENT DOCUMENTS

3,152,844 10/1964 Bueler ................................. 303/52

FOREIGN PATENT DOCUMENTS

0000794 2/1979 European Pat. Off. .............. 303/52
2153466 8/1985 United Kingdom .................. 303/52

Primary Examiner—Duane A. Reger
Attorney, Agent, or Firm—Sughrue, Mion, Zinn, Macpeak & Seas

[57] ABSTRACT

The distributor includes a body with first and second inlet connectors for connection to two pressure sources, and first and second outlet connectors for connection to two separate brake circuits. Communication between the inlet connectors and the outlet connectors is controlled by two valves formed coaxially in the body and provided with a common control device. This device comprises first and second pistons movable coaxially in the body to control the first and second valves. The first piston is movable by means of the operation of the brake pedal and has an extension which extends through an aperture in the second. The latter has an associated spring which biasses it towards the position in which it opens the second valve. First and second reaction members are movable on the extension of the first piston, the first of these cooperating with the second piston and the second being located between the first reaction member and an end retaining head of the extension. Between the reaction members is a spring which urges the first of these towards the first piston and the second against the retaining head. A stop member is provided in the body for stopping the second reaction member relative to the extension of the first piston when the latter is close to the position in which it causes the opening of the first valve, so that further movement of the first piston causes compression of the spring between the reaction members. This spring is therefore not compressed in the initial operating phase of the brake pedal and hence does not provide any reaction to the foot. This spring is compressed only when the opening of the valves is imminent and the consequent reaction transmitted to the foot of the driver is an advantageous indication of the imminence of the opening of the valves.

3 Claims, 3 Drawing Sheets

PNEUMATIC DISTRIBUTOR OF THE DUPLEX TYPE FOR MOTOR VEHICLE BRAKING SYSTEMS

DESCRIPTION

The present invention relates to a pneumatic distributor of the duplex type for motor vehicle braking systems.

In particular, the invention provides a pneumatic distributor of the type comprising a body with first and second inlet connectors for connection to respective pressure sources, and first and second outlet connectors for connection to two separate brake circuits; first and second valves being formed coaxially in the body and arranged to put the first inlet connector into communication with the first outlet connector and the second inlet connector into communication with the second outlet connector respectively, the valves having a common control device including:

- first and second control pistons movable coaxially within the body to control the first and second valves respectively, the first piston being controllable by means of the brake pedal and having an extension which extends through an aperture in the second piston;
- first resilient means biassing the second piston towards the position in which it opens the second valve, and
- second resilient means cooperating with the extension of the first piston and opposing the action of the first resilient means on the second piston.

In such a known pneumatic distributor, the second resilient means comprise a helical spring which reacts at one end against a reaction surface of the body and at the other end against the extension of the first piston. This extension can return the second piston to the rest position, under the action of the helical spring, when the brake is released. During the braking phase, the helical spring between the body and the extension of the first piston is compressed as a result of the operation of the brake pedal and it contributes to the creation of a reaction to the foot which the driver must overcome to apply the brake.

The object of the present invention is to provide a pneumatic distributor of the aforesaid type in which the second resilient means cooperating with the extension of the first piston do not provide any contribution to the reaction to the driver's foot during the initial phase of operation of the brake pedal until the condition of imminent opening of the valves of the distributor is reached.

This object is achieved according to the invention by means of a pneumatic distributor device of the type specified above, the main characteristic of which lies in the fact that the common control device for the valves comprises:

- a first reaction member movable along the extension of the first piston and through the aperture in the second piston, and
- a second reaction member movable along the extension between the first reaction member and end retaining means for the extension;
- the second resilient means being located between the reaction members so as to thrust the first and second reaction members towards the first piston and towards the retaining means respectively;
- stop means being provided in the body for stopping the second reaction member relative to the extension of the first piston only when the latter is close to the position in which it causes the opening of the first valve, so that the further movement of the first piston causes the compression of the second resilient means between the reaction members.

By virtue of these characteristics, the second resilient means in the distributor of the invention do not load the brake pedal during the initial travel of the control pistons but contribute to the reaction to the driver's foot only when the opening of the valves is imminent, in practice providing a useful signal to the driver of the imminence of the application of the braking action.

Further characteristics and advantages of the pneumatic distributor of the invention will become apparent from the detailed description which follows with reference to the appended drawings, provided purely by way of non-limiting example, in which.

Figure 1:
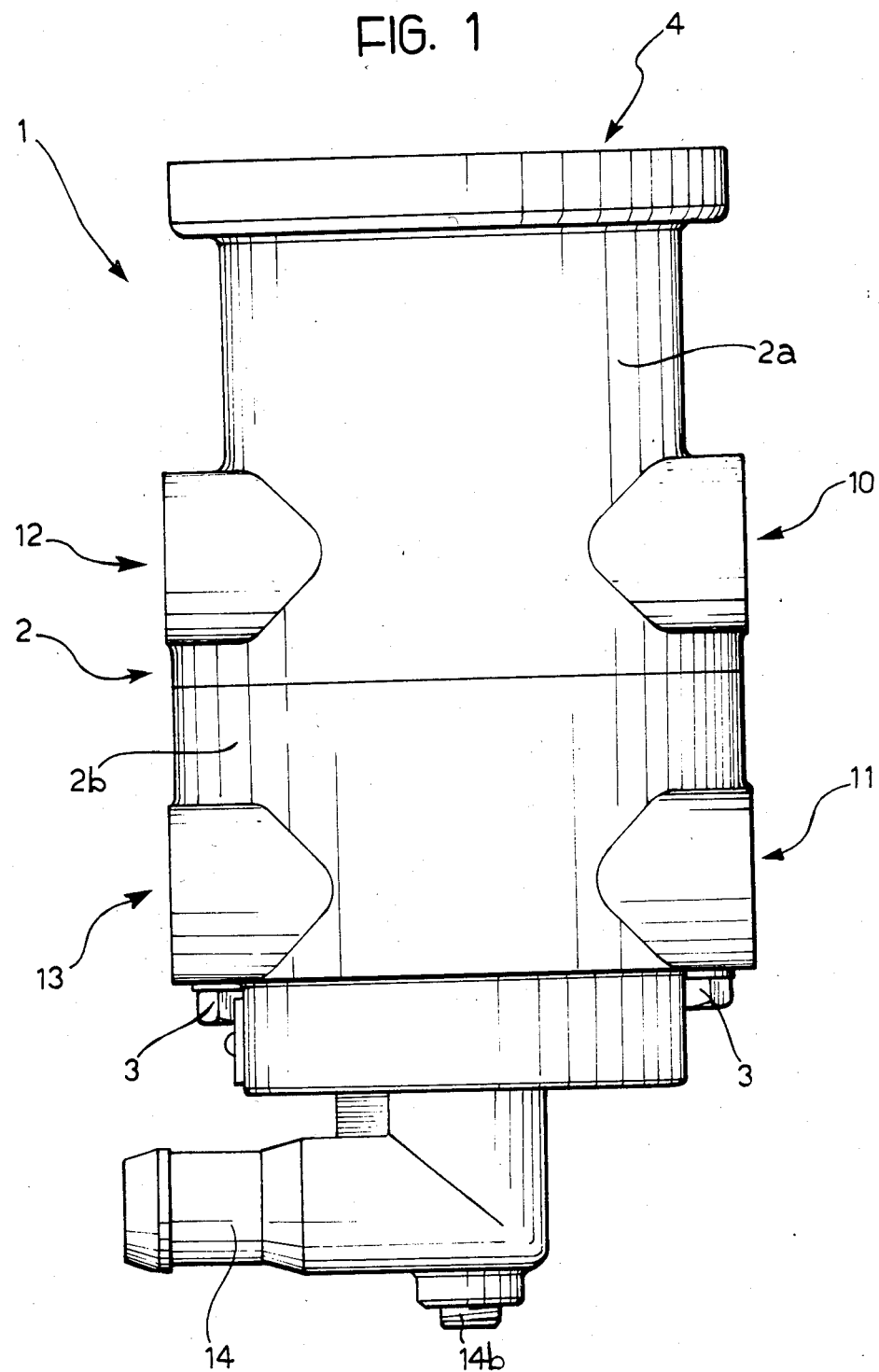
FIG. 1 is a front view of a pneumatic distributor of the invention.

With reference to FIG. 1, a duplex-type pneumatic distributor of the invention is generally indicated 1. This distributor comprises a body 2 formed in two parts 2a, 2b sealed and clamped together by screws 3. The body 2 has an upper aperture 4 in which a cup-shaped piston 5 is sealingly movable. A drive cap 6 is movable in the piston and can be operated as a result of the operation of the brake pedal in known manner, not illustrated. Between the drive cap 6 and the piston 5 are springs 7, 8 and 9.

Two inlet connectors 10 and 11 and corresponding outlet connectors 12 and 13 are provided in the body 2. The connectors 10 and 11 are intended for connection to two pressure reservoirs, while the connectors 12 and 13 are intended for connection to two independent brake circuits of a motor vehicle, for example, the front brake circuit and the rear brake circuit.

The body 2 also has a lower exhaust connector 14 bent at 90° and having a threaded opening 14a closed by a screw stopper 14b.

In the body 2, between the inlet connector 10 and the outlet connector 12, there is a valve comprising a seat 15 and an annular obturator 16 movable along the axis of the control piston 5. At its upper end, the obturator 16 carries an annular washer 17 cooperating with the valve seat 15.

Similarly, a second valve is provided between the inlet connector 11 and the outlet connector 13 and includes a seat 19 and an annular obturator 20 movable along the axis of the control piston 5. This obturator carries a washer 21 cooperating with the valve seat 19. A helical spring 22 urges the obturator 20 against the valve seat 19.

In the middle region of the body 2, between the four connectors 10–13, there is sealingly slidable an annular piston 23 having a central tubular portion 23a sealingly slidable in the obturator 16. A spring 24 is interposed between an upper end shoulder of the obturator 16 and a shoulder of the portion 23a of the piston 23. The spring 24 urges the piston 23 downwardly.

The tubular hub 23a of the piston 23 has an upper extension 23b of substantially frusto-conical form with lateral slits 23c. This extension extends within the annular obturator 16 and a central aperture 25 is formed in its upper wall facing the control piston 5.

A screw 26 has one end engaged in a central threaded aperture 5a in the control piston 5. The stem of this screw extends coaxially within the tubular hub 23a of the piston 23. Two tubular reaction members, indicated 27 and 28, are disposed for longitudinal movement on the screw 26 and between them is a helical spring 29 which biasses them away from each other. The upper reaction member 27 is in the form of a tubular sleeve and is movable through the aperture 25 in the top portion of the piston 23. In the rest condition (lack of braking) this reaction member bears at its upper end against the control piston 5. The reaction member has an external annular projection 27a which bears against the top wall of the portion 23b of the piston 23.

The lower reaction member 28 has an internal shoulder 28a which bears against the head 26a of the screw 26. This reaction member also extends beyond the head of the screw 26, extending towards a frusto-conical tubular projection 30 of the body at the mouth of the exhaust connector 14. The helical spring 29 passes through the upper reaction member 27 to bias the piston 23 upwardly and oppose the action of the helical spring 24.

A passage, indicated 31, puts the outlet connector 12 into communication with a chamber 32 above the piston 23.

Figure 2:
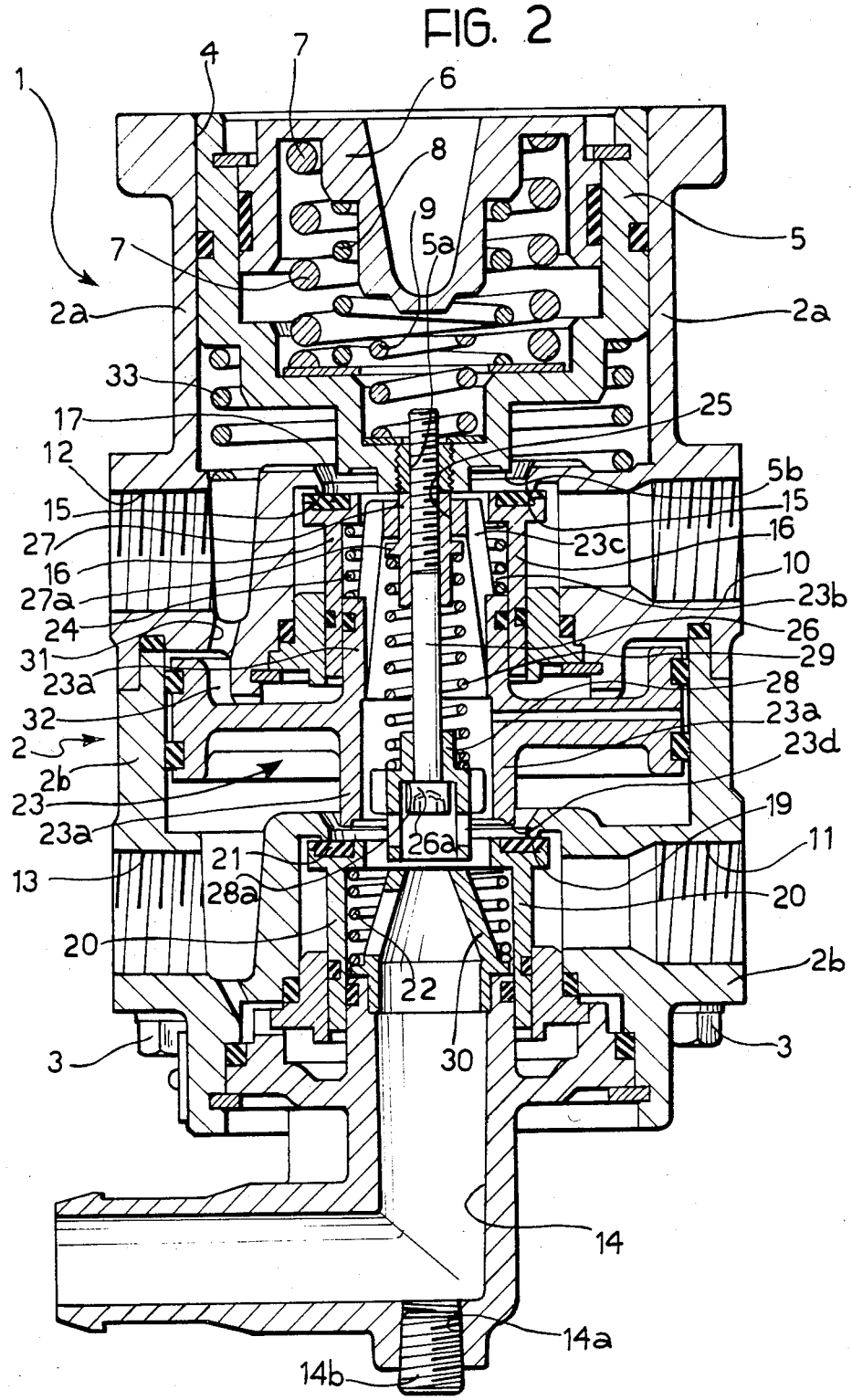
FIGS. 2 and 3 are two sectional views of the distributor of FIG. 1, illustrating two different conditions of the device.
Figure 3:
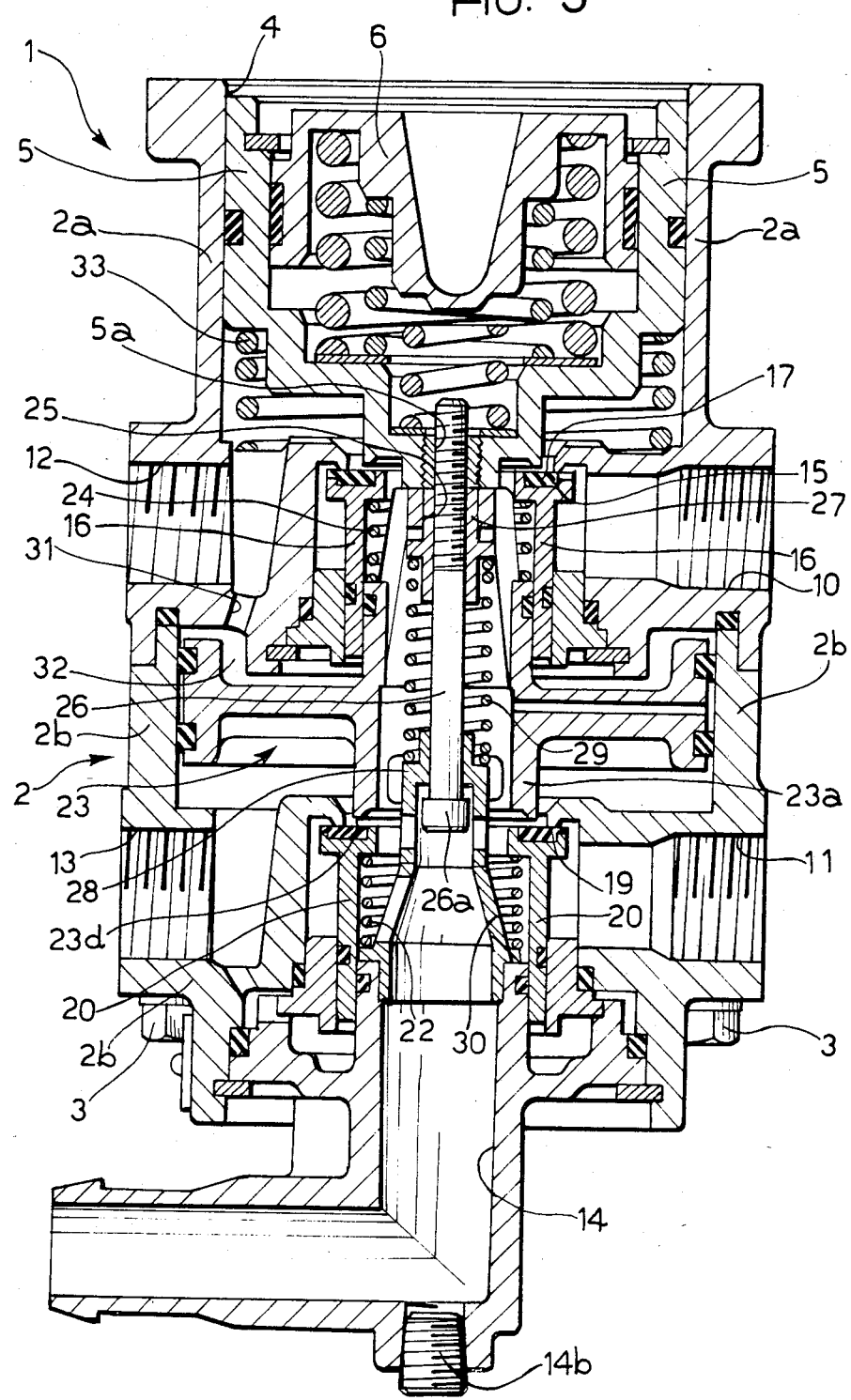

The control piston 5 has a central annular projection 5b which serves as a valve seat and cooperates with the washer 17 of the obturator 16 to disconnect the outlet connector 12 from the exhaust connector 14 during braking (as will be better described below). A helical spring 33 keeps the piston 5 in the position illustrated in FIG. 2, in which the projection 5b is located at a certain distance from the annular obturator 16 in the rest condition of the distributor (lack of braking).

Similarly, the tubular hub 23a of the piston 23 has a lower projection 23d which serves as a valve seat and, as will be described below, cooperates with the washer 21 of the obturator 20 to disconnect the outlet 13 from the exhaust connector 14 during braking. In the rest condition of the distributor, as a result of the equilibrium between the springs 24 and 29, the piston 23 is kept in the position illustrated in FIG. 2, in which the projection 23d is at a certain distance from the washer 21 of the obturator 20. The distributor described above operates in the following manner.

The operation of the brake pedal causes, in known manner, the lowering of the drive cap 6 which causes the lowering of the control piston 5 and its extension represented by the screw 26 by means of the springs 7 and 8. The reaction members 27 and 28 move together with the screw 26 and the spring 29 is not stressed. The spring 24 can extend to push the control piston 23 downwardly. The edge 5b of the control piston 5 comes into contact with the washer 17 of the obturator 16 and breaks communication between the outlet connector 12 and the exhaust connector 14. Almost simultaneously, the lower reaction member 28 abuts the frusto-conical member 30 fixed to the body 2 and is stopped relative to the screw 26 which is still able to descend. The further lowering of the control piston 5 thus causes compression of the spring 29. This spring therefore contributes to the reaction force on the driver's foot, which constitutes a signal to the driver of the imminent opening of the valves and hence of the imminent effective application of the braking force. The further descent of the control piston 5 causes the obturator 16 to move away from the valve seat 15 so that the pressure is propagated from the inlet connector 10 to the outlet connector 12. The chamber 32 is also pressurised through the passage 31 and the resulting force on the piston 23 causes the further downward movement of the latter, moving the obturator 20 away from the valve seat 19 and putting the inlet connector 11 into communication with the outlet connector 13.

When the brake pedal is released, the spring 33 returns the piston 5 upwardly. Immediately the reaction member 28 has moved away from the conical stop member 30, the spring 29 can extend, pushing the piston 23 upwardly and compressing the spring 24 again. The obturators 16 and 20 return to bear against the respective valve seats 15 and 19, disconnecting the inlet connectors 10 and 11 from the outlet connectors 12 and 13. Immediately the pistons 5 and 23 have moved away from the obturators, the outlet connectors 12 and 13 are again put into communication with the exhaust.

It is clear from the above that, in the initial braking phase, the spring 29 does not contribute at all to the reaction on the driver's foot. This spring is compressed and contributes to the reaction on the foot only immediately before the opening of the valves, providing a signal to the driver, as already stated.

After removal of the screw stopper 14b from the exhaust duct, it is possible to reach the screw 26 with a screwdriver to adjust its position relative to the piston 5 and hence adjust the rest distance between the lower reaction member 28 and the stop 30. Thus, it is possible to adjust the instant at which the spring 29 starts to be compressed during braking.

Naturally, the principle of the invention remaining the same, the forms of embodiment and constructional details may be varied widely with respect to that described and illustrated purely by way of non-limiting example, without thereby departing from the scope of the present invention.

I claim:

1. Pneumatic distributor of the duplex type for motor vehicle braking systems, including a body with first and second inlet connectors for connection to respective pressure sources, and first and second outlet connectors for connection to two separate brake circuits; first and second valves being formed coaxially in the body and arranged to put the first inlet connector, into communication with the first outlet connector and the second inlet connector into communication with the second outlet connector respectively, the valves having a common control device including:

first and second control pistons movable coaxially within the body to control the first and second valves respectively, the first piston being controllable by means of the brake pedal and having an extension which extends through an aperture in the second piston;

first resilient means biassing the second piston towards the position in which it opens the second valve, and second resilient means cooperating with the extension of the first piston and opposing the action of the first resilient means on the second piston, characterised in that the common control device for the valves comprises:

a first reaction member movable along the extension of the first piston and through the aperture in the second piston, a second reaction member movable along the extension between the first reaction member and end retaining means for the extension;

the second resilient means being located between the reaction members so as to thrust the first and second reaction members towards the first piston and towards the retaining means respectively;

stop means being provided in the body for stopping the second reaction member relative to the extension of the first piston only when the latter is close to the position in which it causes the opening of the first valve, so that the further movement of the first piston causes the compression of the second resilient means between the reaction members.

2. Pneumatic distributor according to claim 1, characterised in that the rest distance between the second reaction member and the stop means is adjustable so that the instant at which the compression of the second resilient means starts during the braking is correspondingly adjustable.

3. Pneumatic distributor according to claim 1, in which the extension of the first piston is constituted by a screw whose threaded shank engages in a correspondingly-threaded aperture in the first piston, characterised in that the first reaction member is a sleeve assembled around the shank of the screw and movable through the aperture in the second piston, the sleeve having an outer annular projection which can bear against a bearing surface of the second piston to thrust the second piston into disengagement from the second valve when the brake is released.

* * * * *